United States Patent
Han (10) Patent No.: US 9,589,352 B2
(45) Date of Patent: Mar. 7, 2017

(54) POSITION CONTROLLER, METHOD OF CONTROLLING POSITION, AND APPARATUS INCLUDING THE POSITION CONTROLLER

(71) Applicant: Samsung Display Co., Ltd., Yongin (KR)

(72) Inventor: Jeong-Won Han, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 426 days.

(21) Appl. No.: 14/161,411

(22) Filed: Jan. 22, 2014

(65) Prior Publication Data

US 2015/0042786 A1 Feb. 12, 2015

(30) Foreign Application Priority Data

Aug. 7, 2013 (KR) .................. 10-2013-0093792

(51) Int. Cl.
G06T 7/00 (2006.01)

(52) U.S. Cl.
CPC ............ *G06T 7/004* (2013.01); *G06T 7/0044* (2013.01); *G06T 2207/10016* (2013.01); *G06T 2207/30164* (2013.01)

(58) Field of Classification Search
CPC ............ H01L 2924/1204; H01L 24/03; H01L 21/76894; H04N 2201/04713; H04N 2201/04744
See application file for complete search history.

(56) References Cited

U.S. PATENT DOCUMENTS

| 6,842,248 | B1 | 1/2005 | Binnard |
| 2004/0132228 | A1* | 7/2004 | Magno ............... C23C 14/12 438/99 |
| 2005/0007442 | A1* | 1/2005 | Kay ............... H01L 51/0013 347/248 |
| 2011/0022220 | A1* | 1/2011 | Smith ............... G05B 19/401 700/186 |
| 2013/0237797 | A1* | 9/2013 | Muller ............ A61B 5/14532 600/407 |

FOREIGN PATENT DOCUMENTS

| JP | 2007-276388 | 10/2007 |
| JP | 2009-082838 | 4/2009 |
| KR | 10-1999-0083517 | 11/1999 |
| KR | 10-2002-0041748 | 6/2002 |
| KR | 10-2004-0032361 | 4/2004 |
| KR | 10-2006-0100736 | 9/2006 |
| KR | 10-2007-0059496 | 6/2007 |
| KR | 10-2010-0019352 | 2/2010 |
| KR | 10-2012-0111815 | 10/2012 |

* cited by examiner

*Primary Examiner* — Hung Dang
*Assistant Examiner* — Sunghyoun Park
(74) *Attorney, Agent, or Firm* — H.C. Park & Associates, PLC (57) ABSTRACT

A position controller, including a moving part configured to process or measure a workpiece, a laser unit disposed on one side of the moving part and configured to radiate a laser, a mask on which a laser image is formed corresponding to the irradiated laser, and a position control unit configured to position the moving part based on information of the laser image.

19 Claims, 11 Drawing Sheets

POSITION CONTROLLER, METHOD OF CONTROLLING POSITION, AND APPARATUS INCLUDING THE POSITION CONTROLLER

CROSS REFERENCE TO RELATED APPLICATION

This application claims priority from and the benefit of Korean Patent Application No. 10-2013-0093792, filed on Aug. 7, 2013, in the Korean Intellectual Property Office, which is hereby incorporated by reference for all purposes as if fully set forth herein.

BACKGROUND

Field

Exemplary embodiments of the present invention relate to a position controller, a method of controlling a position, and an apparatus including the position controller.

Discussion of the Background

Display apparatuses are used to provide visual information such as images or is pictures to users. Such display apparatuses are manufactured in various shapes.

Particularly, organic light-emitting display apparatuses are light-emitting displays for emitting light by electrically exciting organic compounds. These displays are attracting attention as next generation displays, because they are driven at a low voltage, are easily manufactured thin, and overcome the limitations of liquid crystal displays to provide wide optical viewing angles and rapid response speeds.

The goals in manufacturing display apparatuses are high precision, high integration, and large size. Therefore, accurately positioning an apparatus for processing/observing workpieces is important. For this purpose, deposition systems for display apparatuses includes position controllers for checking the current position of workpieces or processing/observing apparatus and accurately moving the workpieces or processing/observing apparatus to target positions.

Generally, position controllers include interferometers using lasers and mirrors. For example, the mirror may be disposed on a stage, on which the workpiece is placed, and the interferometer may be disposed outside to continuously observe the position of the stage. Alternatively, the interferometer may be disposed on the stage and the mirror is disposed outside to continuously observe a position of the stage.

However, as the enlargement of the stage have been promoted, it became more difficult to manufacture larger mirrors with high precision, increasing the manufacturing cost. To overcome such limitations, research has been performed to replace large minors with smaller minors combined. However, a new problem arose as it became necessary to precisely arrange a plurality of mirrors. Additionally, since an interferometer is affected by peripheral temperature and humidity, additional devices for maintaining temperature and humidity uniformly are utilized.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide position controller having a simple configuration that precisely controls a position.

Additional features of the invention will be set forth in the description which follows, and in part will be apparent from the description, or may be learned by practice of the invention.

An exemplary embodiment of the present invention discloses a position controller, including a moving part configured to process a workpiece, a laser unit disposed on one side of the moving part and configured to radiate a laser, a mask on which a laser image is formed corresponding to the irradiated laser, and a position control unit configured to position the moving part based on information of the laser image.

An exemplary embodiment of the present invention discloses a processing apparatus, including a position controller including a moving part configured to process a workpiece, a laser unit disposed on one side of the moving part and configured to radiate a laser, a mask on which a laser image is formed corresponding to the irradiated laser, and a position control unit configured to position the moving part based on information of the laser image, and a stage configured to support the workpiece.

An exemplary embodiment of the present invention discloses a measuring apparatus, including a position controller including a moving part configured to measure a workpiece, a laser unit disposed on one side of the moving part and configured to radiate a laser, a mask on which a laser image is formed corresponding to the irradiated laser, and a position control unit configured to position the moving part based on information of the laser image, and a stage configured to support the workpiece.

An exemplary embodiment of the present invention also discloses a method of controlling a position of a moving part, the method including relocating the moving part by a first distance unit or more, radiating a laser from a laser unit disposed on one side of the moving part onto a mask disposed in a backward area of the moving part, and relocating the moving part by a second distance unit based on information of a laser image formed by the laser irradiated on the mask, wherein the second distance unit is smaller than the first distance unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 5A(i), 5A(ii), 5B(i), 5B(ii), 5C(i), and 5C(ii) are conceptual schematics illustrating a method of determining a position of the moving part using two laser units, according to an embodiment of the present invention.

DETAILED DESCRIPTION OF THE ILLUSTRATED EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, the embodiments of the present invention will be described in detail with reference to the attached drawings. However, since one or more embodiments of the present invention are not limited to embodiments disclosed below but may be embodied as various different shapes, the embodiments below are provided to fully disclose the one or more embodiments of the present invention and to allow a person with ordinary skill to consummately know the scope of the embodiments of the present invention. Also, for convenience of description, in the drawings, sizes of elements may be exaggerated or contracted. For example, a size of a thickness of each of the elements shown in the drawings is arbitrarily shown for convenience of description and is not limited thereto.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
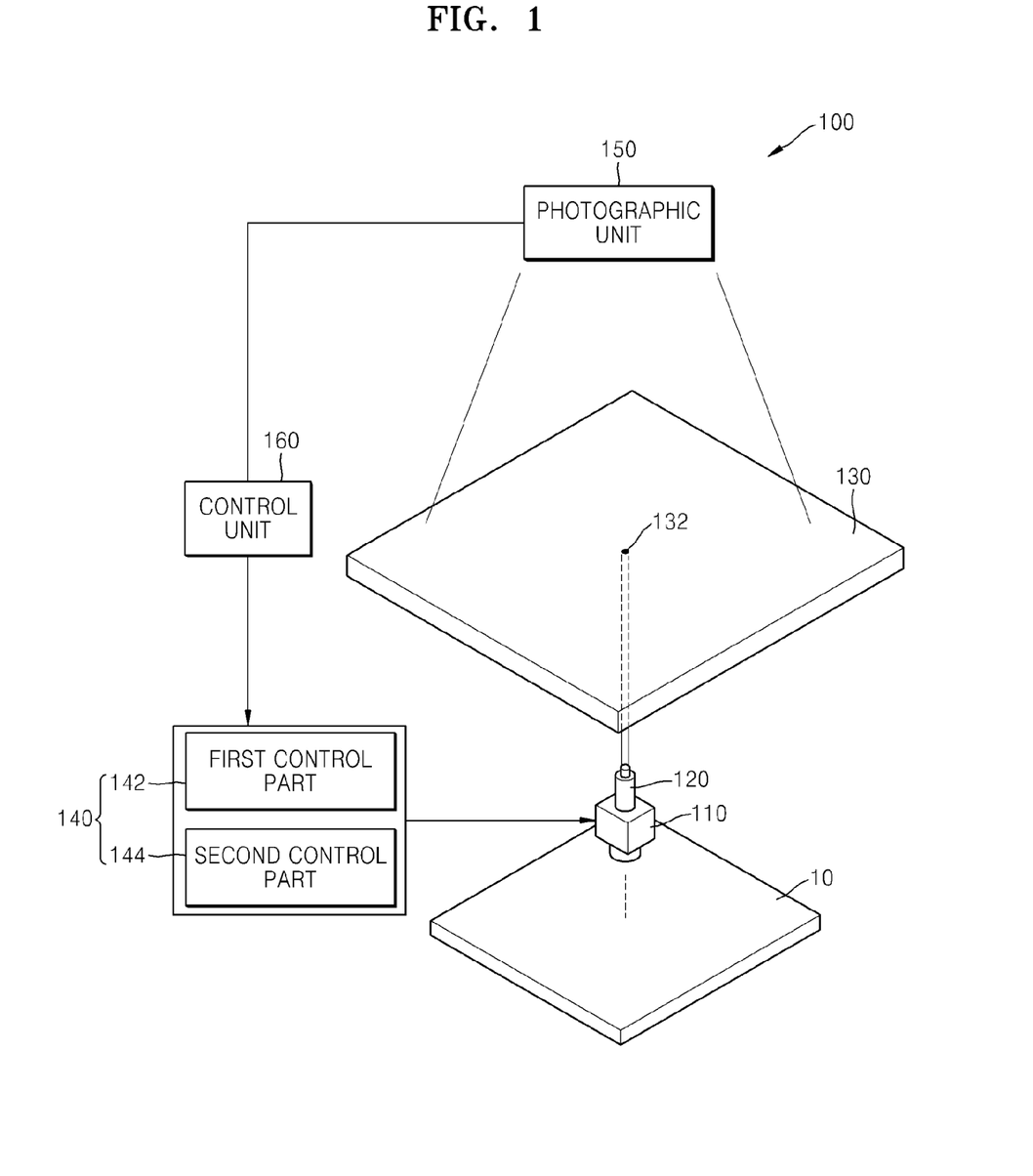
FIG. 1 is a schematic illustrating an exploded perspective view of a position controller according to an exemplary embodiment of the present invention.

FIG. 1 is a schematic illustrating an exploded perspective view of a position controller 100 according to an exemplary embodiment of the present invention. Referring to FIG. 1, the position controller 100 may include a moving part 110 configured to process or measure a workpiece 10, a laser unit 120 disposed on one side of the moving part 110 configured to radiate a laser, a mask 130 on which the laser is irradiated to form a corresponding image which is, hereinafter, referred to as a laser image 132, and a position control unit 140 configured to control a position of the moving part 110 based on information of the laser image 132. The position controller 100 may further include a photographic unit 150 configured to capture the laser image 132, and a control unit 160 configured to determine information of the laser image 132 based on the image captured by the photographic unit 150 and determine a present position of the moving part 110 from the information of the laser image 132. The position controller 100 may also include supporters configured to support the moving part 110, the mask 130, and the photographic unit 150, respectively, and a driving unit configured to position the photographic unit 150.

When the moving part 110 is configured to process the workpiece 10, the position controller 100 may form a component of a processing device. Also, when the moving part 110 is configured to measure the workpiece 10, the position controller 100 may form a component of a measuring device. The processing device and the measuring device may each further include stage unit to support the workpiece 10, respectively.

The moving part 110 is a device for processing or measuring the workpiece 10, and may be configured to have different function according to the objective of the device, such as to process or measure the workpiece 10. For example, when the objective of the device is to deposit a layer on the workpiece 10 using an inkjet printing method, the moving part 110 may be an inkjet head. When the objective of the device is to cut the workpiece 10, the moving part 110 may be a die cutting unit. When the objective of the device is to radiate a laser to the workpiece 10, the moving part 110 may be a laser radiation head. Also, when the objective of the device is to measure the status of the workpiece 10, such as size, the moving part 110 may be an optical device capable of measuring the status of the workpiece 10.

The moving part 110 includes a functioning unit to perform the function corresponding to the objective of the device, such as to process or measure the moving part 110, and a housing to enclose the functioning unit. At least a part of the functioning unit is exposed toward the workpiece 10. An area where the functioning unit is exposed is referred to as a front end of the moving part 110, and an area where the workpiece 10 is present is referred to as a forward area of the moving part 110. Also, an area opposite to the front end of the moving part 110 is referred to as a rear end of the moving part 110, and a space to which the rear end is facing is referred to as a backward area of the moving part 110.

The laser unit 120 may be disposed on one side of the moving part 110 and may radiate a laser. The laser unit 120 may be disposed on the rear end of the moving part 110 but it may also be disposed on a lateral side of the moving part 110. The laser unit 120 may also be provided in plural, as described below. The laser unit 120 may be configured to selectively radiate a laser according to an instruction by a user. That is, the user may input an instruction to radiate a laser when the user wants to check the present position of the moving part 110, and the laser unit 120 may radiate a laser. The laser unit 120 may also be configured to continuously or periodically radiate a laser.

The mask 130 is disposed in a space to which the laser is radiated, and the laser image 132 may be formed on the mask 130. For example, the mask 130 may be disposed in the backward area of the moving part 110, and the laser unit 120 may radiate the laser toward the backward area of the moving part 110 to form the laser image 132 directly on the mask 130. The mask 130 may be formed of a transparent material to allow a laser image to be clearly formed, and may include certain pattern. The pattern may include marks periodically arranged in two-dimensional at intervals of a certain unit to precisely guide the control of the position of the moving part 110. The mark may have a lattice shape or a circular, oval, or polygonal shape, or any shape that can be used to define the position of the moving part 110.

The mask 130 may be replicated by manufacturing process such as nanoimprinting, electroforming, and nano/micro contract printing. By implementing the position controller 100 using mass-produced mask 130, the position controller 100 of current exemplary embodiment can be manufactured at relatively lower costs compared to the conventional position controllers that implement mirrors.

Also, by manufacturing the mask 130 with a material having a low thermal expansion coefficient, the influences from external environments such as temperature can be reduced, and the precision in position control may be improved.

The photographic unit 150 captures the laser image 132 formed on the mask 130. The photographic unit 150 may be a charge-coupled device (CCD) camera. The CCD camera is a digital camera that converts an image into an electric signal using a CCD and stores it as digital data in a memory medium such as a flash memory. The photographic unit 150 may also be embodied as a complementary metal-oxide semiconductor (CMOS) camera. The laser unit 120, the mask 130, and the photographic unit 150 are disposed on the same line. The mask 130 is disposed between the laser unit 120 and the photographic unit 150, so that the photographic unit 150 may accurately capture a laser image.

The control unit 160 may obtain information on the laser image 132 from by the photographic unit 150. The information on the laser image 132 may include at least one of coordinate information and a shape of the laser image 132. The control unit 160 may determine the present position of the moving part 110 based on the information on the laser image 132. When the moving part 110 is at the position to perform the intended processing or measuring (hereinafter, referred to as a target position) the control unit 160 may provide the result to the control unit (not shown) of the processing or measuring device. When the moving part 110 is not at the target position, the control unit 160 may control the position control unit 140 to relocate the moving part 110 to the target position.

The position control unit 140 may include at least two control parts: a first control part 142 that moves the moving part 110 by a first distance unit; and a second control part 144 that moves the moving part 110 by a second distance unit and rotates the moving part 110, wherein the second distance unit is smaller than the first distance unit. When the control unit determines that the moving part 110 is to be relocated from the present position to the target position by a first distance unit or more, the control unit 160 may control the first control part 142 to move the moving part 110. When the distance between the present position of the moving part 110 and the target position is less than the first distance unit, the control unit 160 may control the second control part 144 to move the moving part 110 to the target position. Since the first control part 142 and the second control part 144 may move the moving part 110 by different unit, the moving part 110 may be relocated to the target position accurately.

Figure 2A:
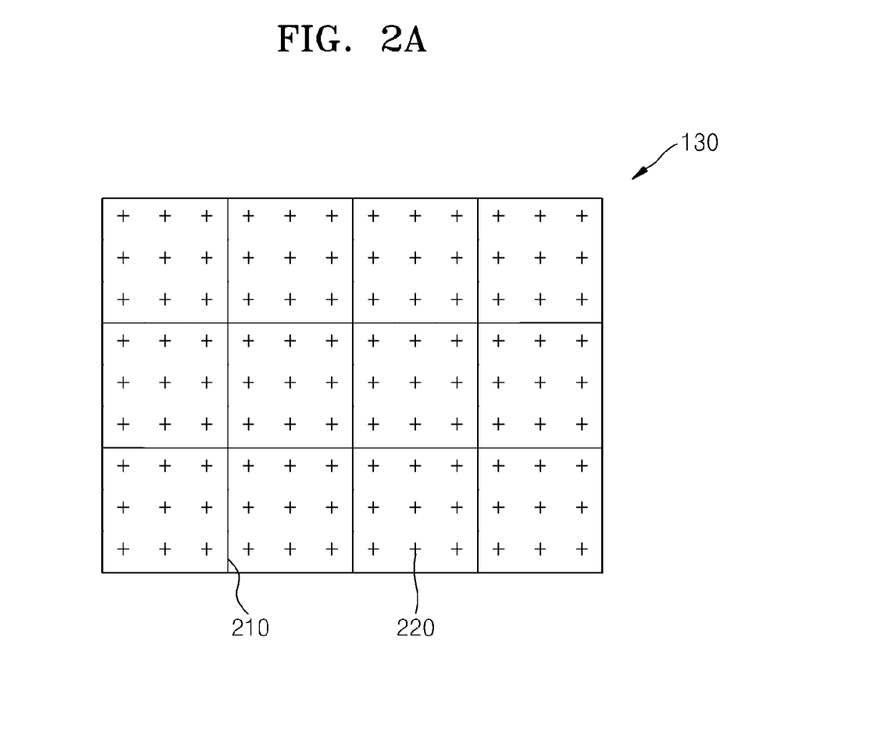
FIGS. 2A and 2B are schematics illustrating exemplary embodiments of a mask.
Figure 2B:
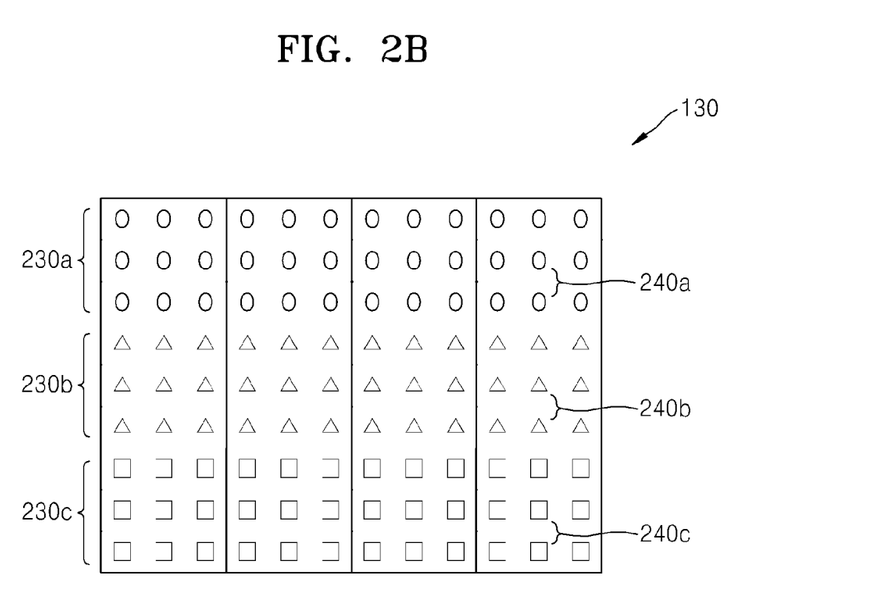

FIGS. 2A and 2B are schematics illustrating exemplary embodiments of the mask 130. Referring to FIG. 2A, the mask 130 may include a first mark 210 which is a lattice pattern, each mark disposed at intervals of the first distance unit, and a second mark 220 which is a cross pattern disposed at interval of the second distance unit. Referring to FIG. 2B, the mask 130 may include different sets of patterns (230a, 230b, and 230c) at the interval of the first distance unit, and within each set of patters, the patterns are disposed at interval of the second distance unit (240a, 240b, and 240c). In the current exemplary embodiment, the position information formed on the mask 130 two-dimensionally and therefore the position of the moving part 110 may be more precisely measured by the laser image 132 formed on the mask 130.

Figure 3A:
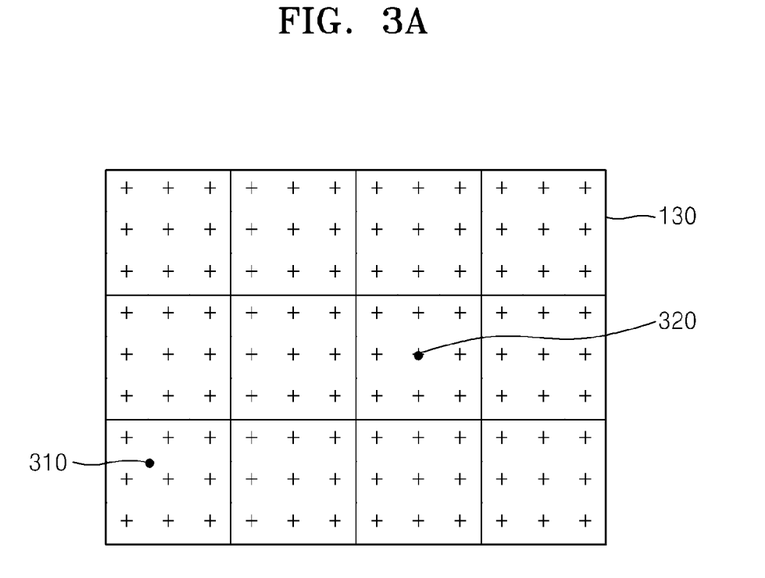
FIG. 3A is a conceptual schematic illustrating a method of moving a moving part, according to an exemplary embodiment of the present invention.
Figure 3B:
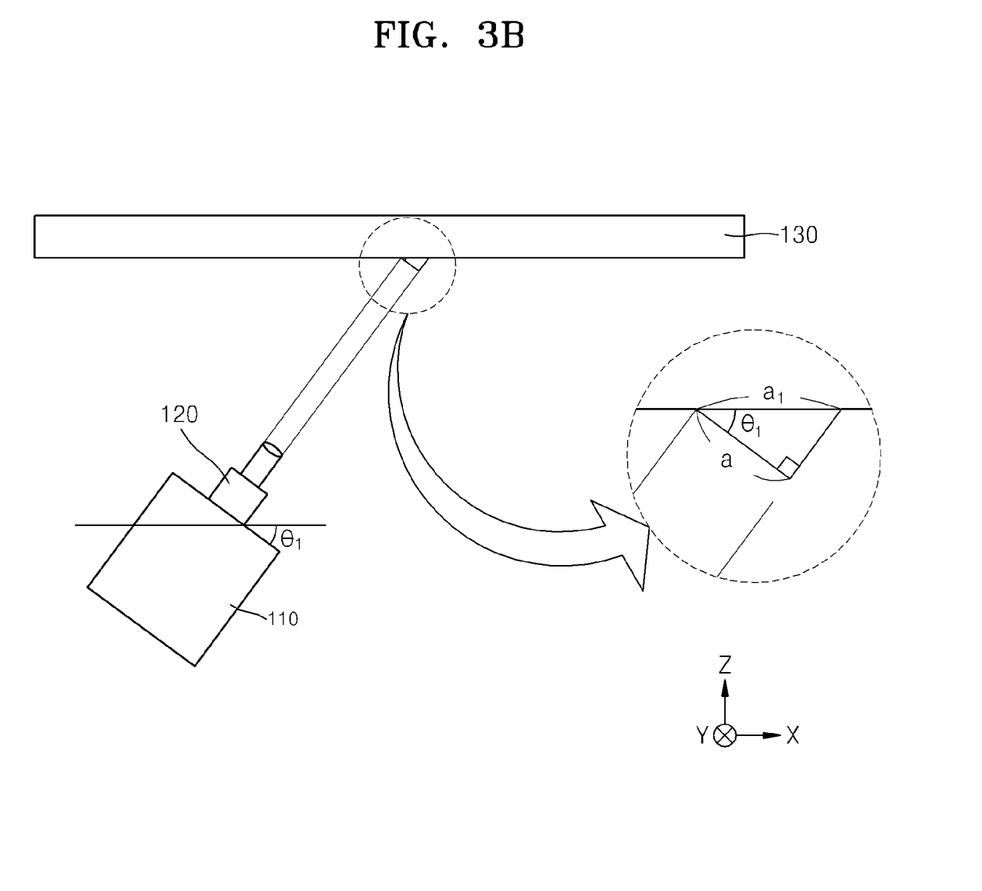
FIG. 3B is a conceptual schematic illustrating a method of rotating the moving part, according to an exemplary embodiment of the present invention.

FIG. 3A is a conceptual schematic illustrating a method of moving the moving part 110, according to an exemplary embodiment of the present invention. FIG. 3B is a conceptual schematic illustrating a method of rotating the moving part 110, according to an exemplary embodiment of the present invention.

Referring to FIG. 3A, the laser unit 120 radiates laser to the mask 130 to form a laser image 310. The control unit 160 may determine the position of the moving part 110 from the coordinate information of the laser image 310 on the mask 130. When a position of the laser image 310 is different from a target position 320, the control unit 160 controls the position control unit 140 to transfer the moving part 110 to the target position 320.

Referring to FIG. 3B, the controlling part 160 may determine whether the moving part 110 is tilted according to a shape of the laser image formed on the mask 130. A shape of laser radiated by the laser unit 120 may be referred to as a reference image. When the laser image formed on the mask 130 is identical to the reference image, the control unit 160 may determine that the moving part 110 is disposed parallel to the mask 130 not tilted, because the laser is irradiated to the mask 130 in right angle. On the other hand, when the laser image formed on the mask 130 is different from the reference image, the control unit 160 may determine that the moving part 110 is tilted with respect to the mask 130.

For example, when the moving part 110 is tilted by θ1 with respect to the mask 130, the laser image formed on the mask 130 may have a diameter $a_1$ greater than the diameter a of the reference image. The control unit 160 may calculate the tilted angle θ1 using the diameter of the reference image and the diameter al of the laser image.

Figure 4:
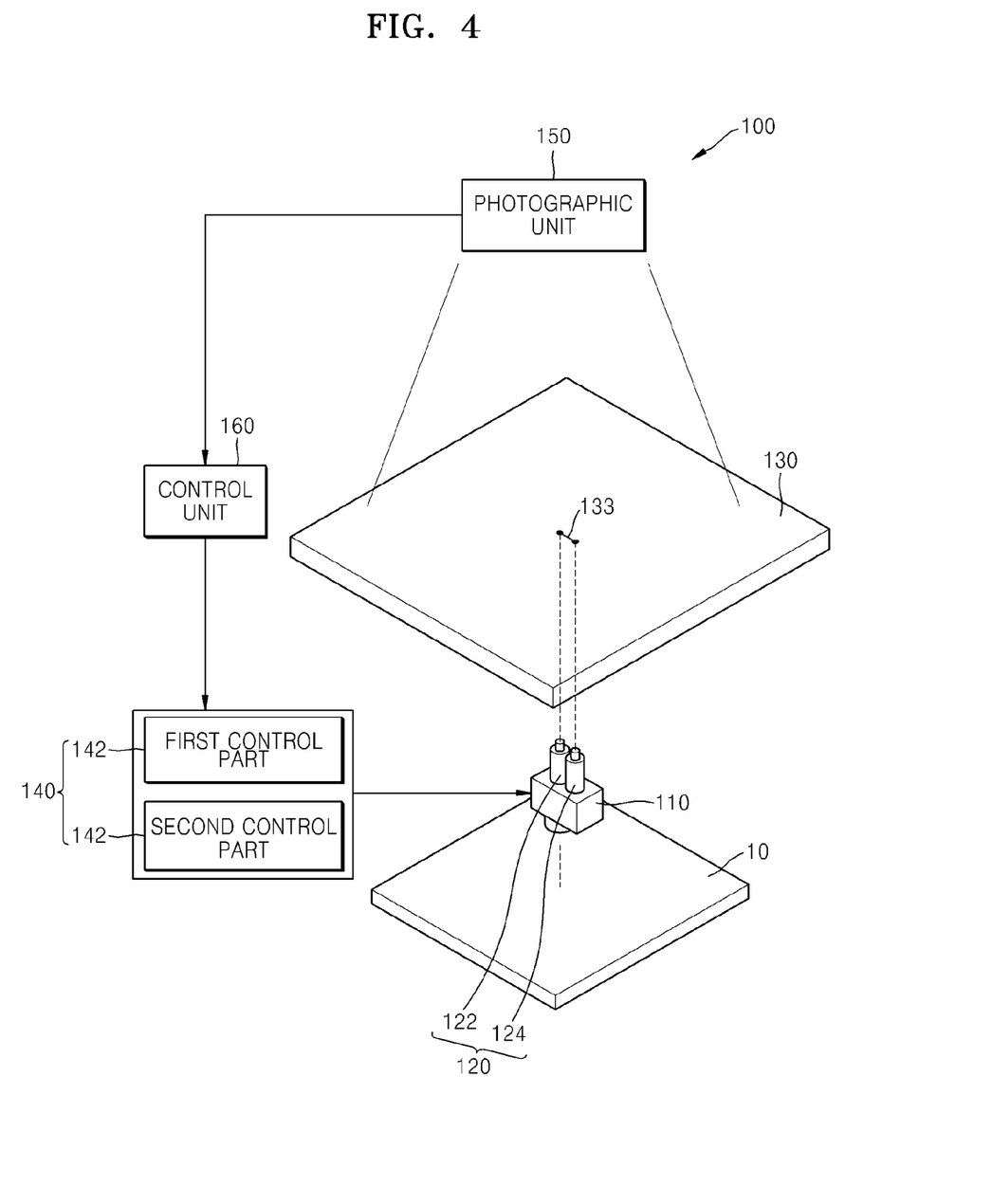
FIG. 4 is a schematic illustrating an exploded perspective view of a position controller according to an exemplary embodiment of the present invention.

A plurality of laser units 120 may be disposed on the moving part 110 to allow the position controller 100 to determine and control the position of the moving part 110 more precisely. FIG. 4 is a schematic illustrating an exploded perspective view of the position controller 100 according to an exemplary embodiment of the present invention. Compared to FIG. 1, the position controller 100 of FIG. 4 includes two laser units, namely, first and second laser units 122 and 124 disposed on the rear end of the moving part 110. The first and second laser units 122 and 124 may radiate lasers onto the mask 130 at the same time. The photographic unit 150 may capture the two corresponding laser images. The control unit 160 may determine the position of the moving part 110 from the distance and the vector direction between the two laser images.

Figure 5A:
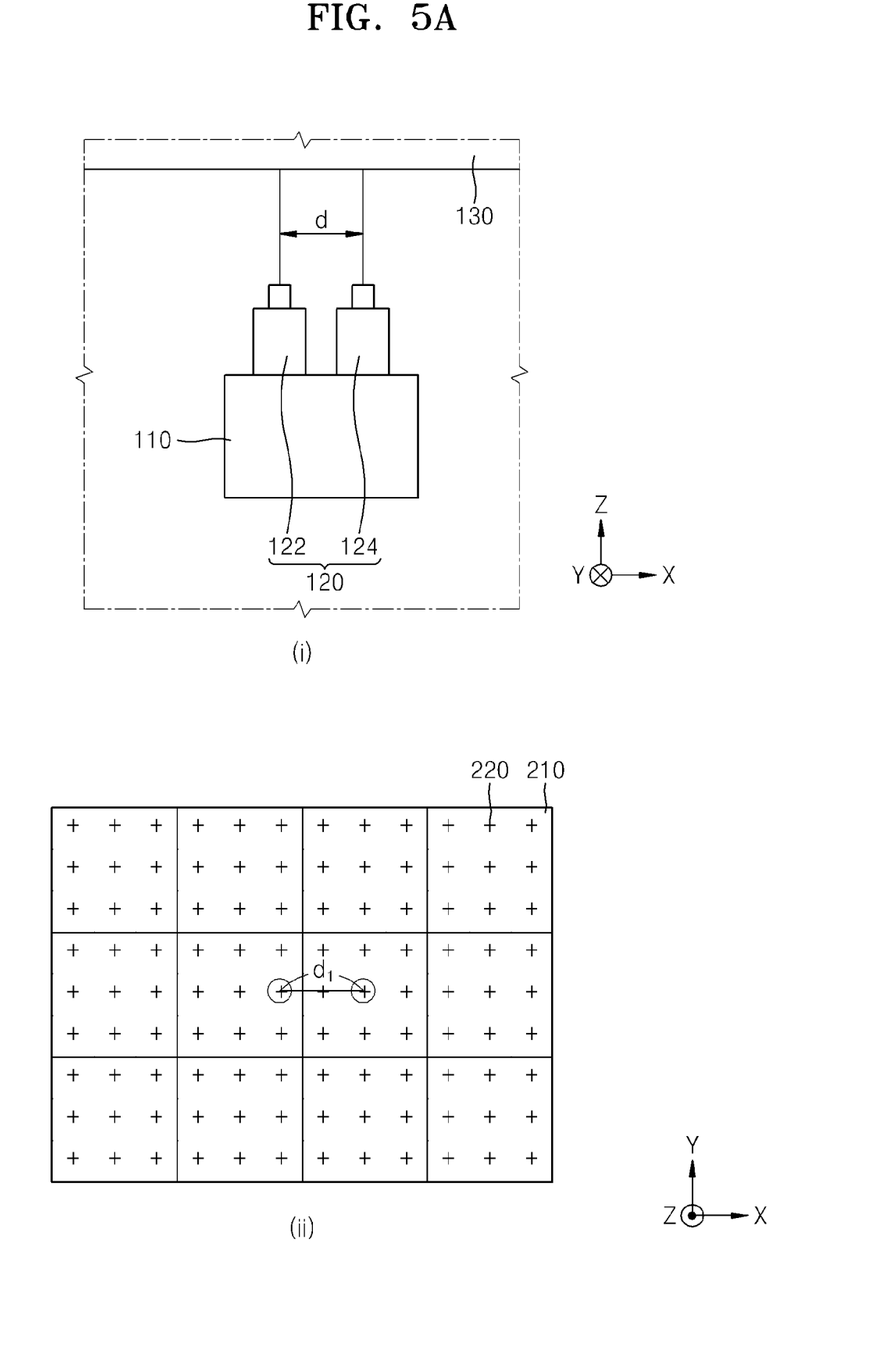
Figure 5B:
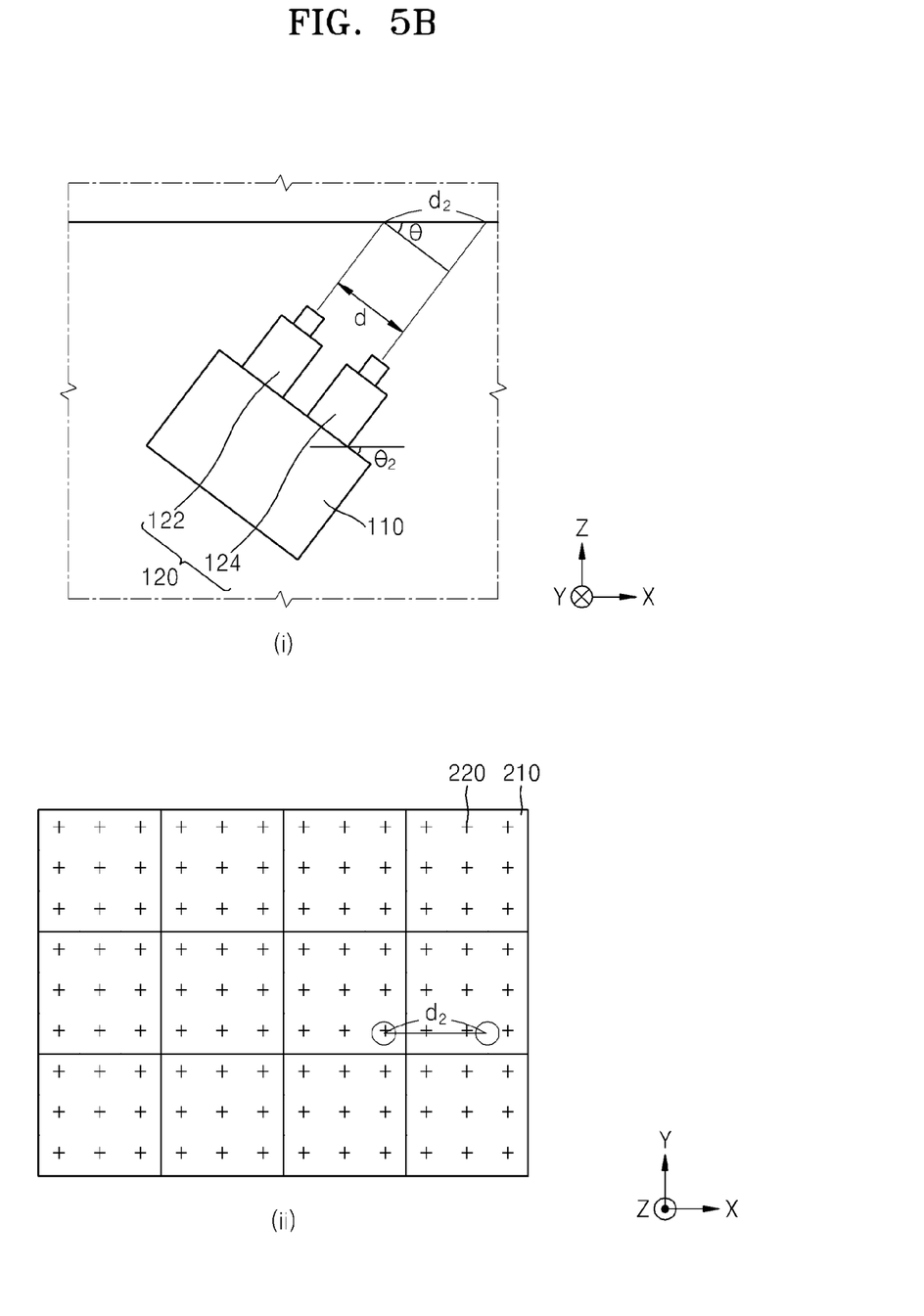
Figure 5C:
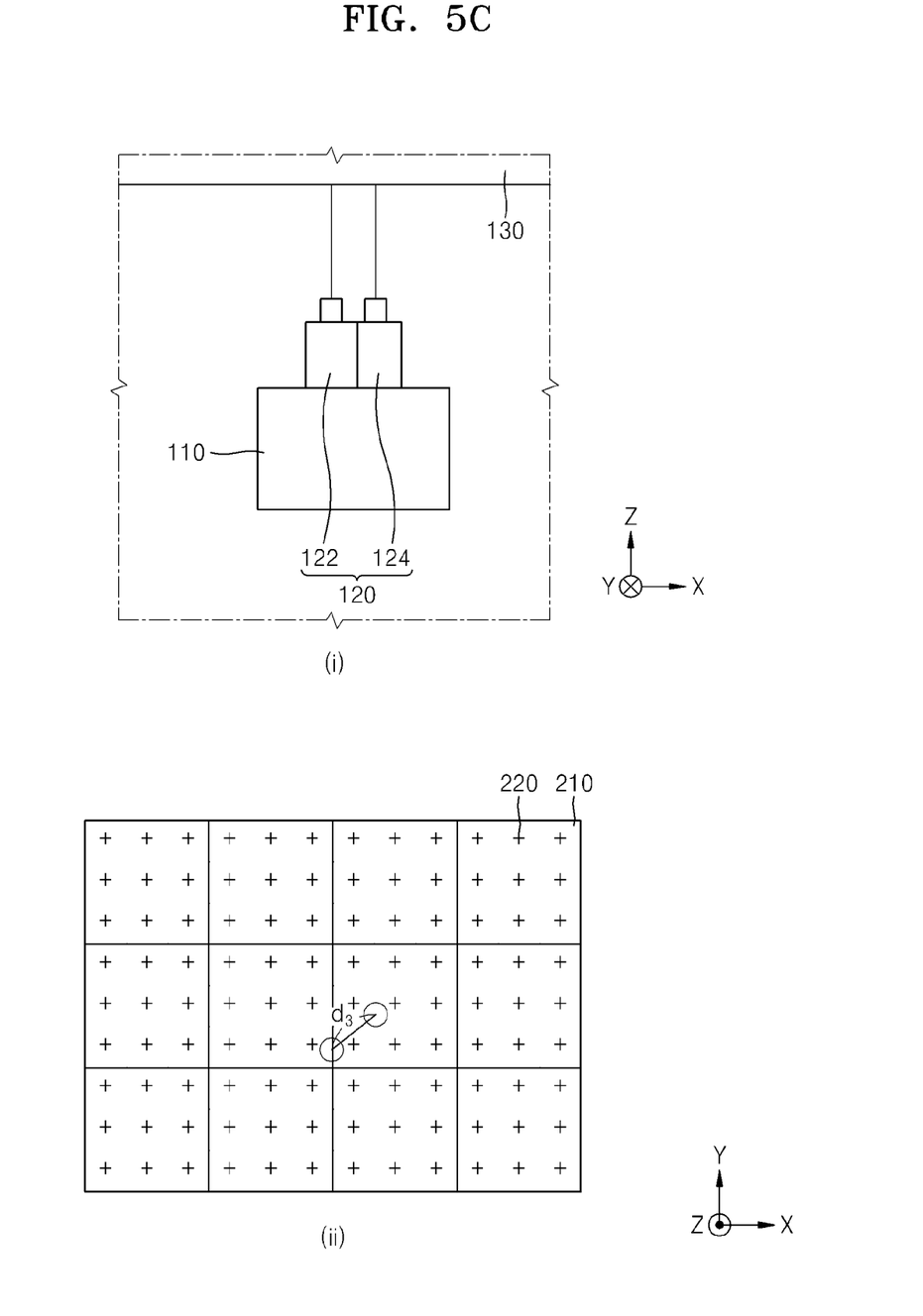

FIGS. 5A to 5C are conceptual schematic illustrating a method of determining the position of the moving part 110 using the first and second laser units 112 and 124, according to an embodiment of the present invention.

Referring to FIG. 5A (i) and (ii), the moving part 110 is disposed in parallel with an X-axis on an XY plane parallel to the mask 130. The first and second laser units 122 and 124 radiate lasers onto the mask 130 forming the first and second laser images in parallel with the X-axis. The distance $d_1$ between the first and second laser images is identical to the distance d between the first and second laser units 122 and 124. Accordingly, the control unit 160 may determine that the moving part 110 is disposed parallel to the mask 130 and parallel with the X-axis, from relative positions of the first and second laser images and the distance d1.

Referring to FIG. 5B (i) and (ii), the moving part 110 may be tilted respect to the XY plane parallel with an X-axis. The first and second laser units 122 and 124 irradiate lasers onto the mask 130 forming the first and second laser images in parallel with the X-axis, with the distance $d_2$ between the first and second laser images greater than the reference distance d, the distance between the first and second laser units 122 and 124. Accordingly, from relative direction information and the distance $d_2$ between the first and second laser images, the control unit 160 may determine that the moving part 110 is in parallel with the X-axis but tilted respect to the mask 130.

Referring to FIG. 5C (i) and (ii), the moving part 110 may be disposed not parallel to either the X-axis or the Y-axis on the XY plane parallel to the mask 130. The first and second laser units 122 and 124 may radiate lasers onto the mask 130 to form the first and second laser images not parallel to either the X-axis or the Y-axis, with the distance $d_3$ between the first and second laser images identical to the reference distance d. Accordingly, the control unit 160 may determine that the moving part 110 is tilted with respect to a Z-axis, from the distance $d_3$ and relative position relation between the first and second laser images.

In the current exemplary embodiment of using two laser units, the control unit 160 may determine whether the moving part 110 is tilted with respect to the Z-axis or the Y-axis and a gradient thereof. However, it is impossible to determine whether the moving part 110 is tilted in a positive direction or a negative direction with respect to the Z-axis.

Figure 6:
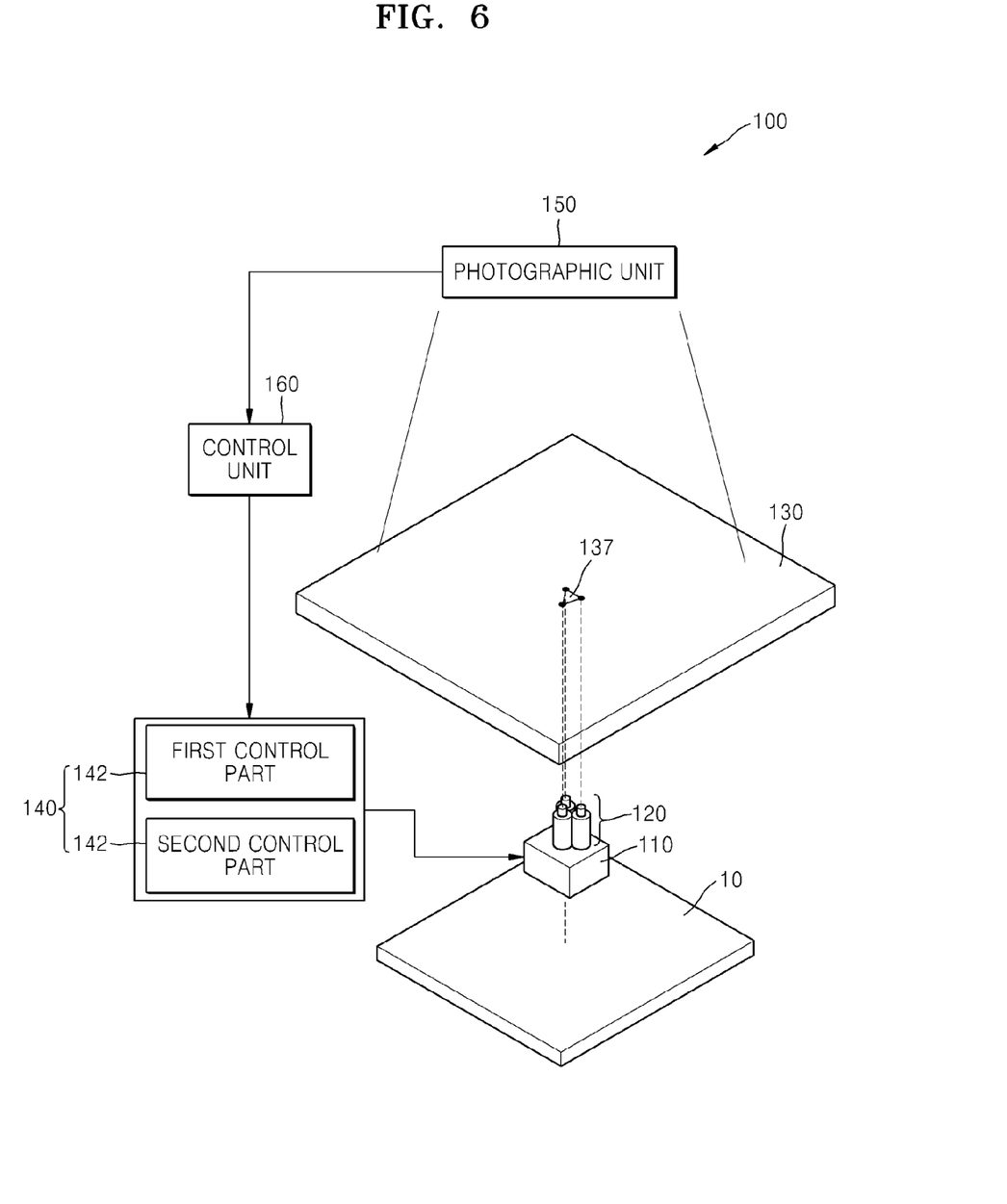
FIG. 6 is a schematic illustrating an exploded perspective view of a position controller according to an exemplary embodiment of the present invention.

FIG. 6 is a schematic illustrating an exploded perspective view of the position controller 100 according to an exemplary embodiment of the present invention. Comparing to FIG. 1, the position controller 100 of FIG. 6, includes three laser units 120 disposed on the rear end of the moving part 110. The three laser units 120 may radiate lasers onto the mask 130 at the same time. The photographic unit 150 may capture the three corresponding laser images. The control unit 160 may determine the position of the moving part 110 using a shape and a size of a polygon 137 formed by connecting the three laser images. In the current exemplary embodiment, the three laser units 120 are disposed as an equilateral triangle. When the polygon 137 is an equilateral triangle with a size identical to that of a figure formed by connecting the three laser units 120 (hereinafter, referred as reference figure), the control unit 160 may determine that the moving part 110 is not tilted with respect to the mask 130. When the shape or size of the polygon 137 is not identical to the reference figure, the control unit 160 may calculate the tilted angle and direction from the difference between the polygon 137 and the reference figure.

When a plurality of laser units are provided, the plurality of laser units may be disposed on the rear end of the moving part 110 but is not limited thereto. At least one of the laser units may be disposed on the rear end of the moving part 110, and other laser units may be disposed on a lateral side of the moving part 110. Then, the control unit 160 may obtain coordinate information and tilt information of the moving part 110 from the absolute coordinates of each of the laser images.

Also, one position controller 100 may include a plurality of moving parts 110. The plurality of moving parts 110 may operate independently or in line with one another. The control unit 160 may determine positions of the respective moving parts 110 independently or in line with one another.

According to the current exemplary embodiment of the present invention, a position of a moving part may be measured without minors and may be more precisely controlled.

Figure 7:
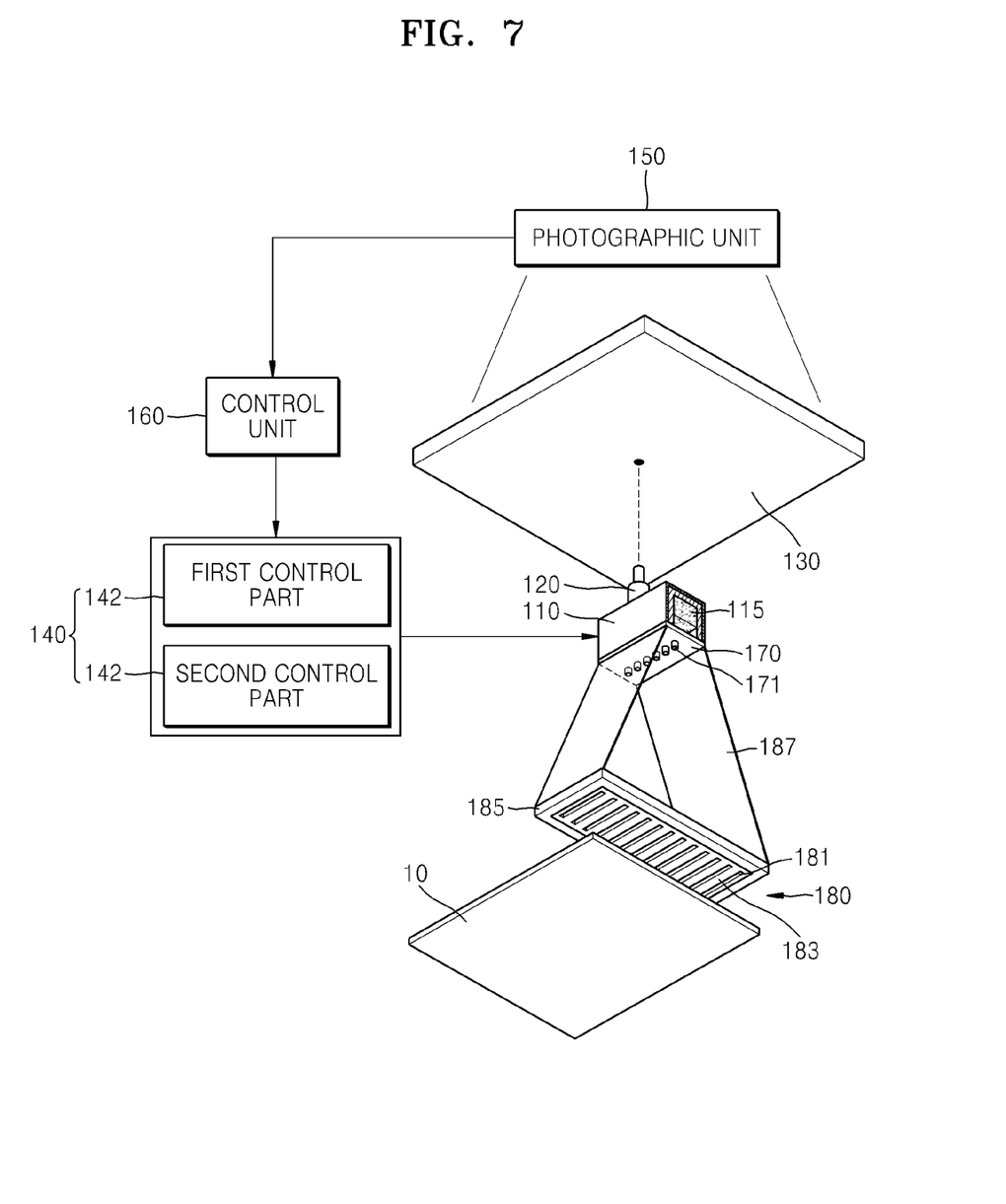
FIG. 7 is a schematic perspective view illustrating a part of a deposition apparatus according to an exemplary embodiment of the present invention.

FIG. 7 is a schematic perspective view illustrating a part of a deposition apparatus according to an exemplary embodiment of the present invention. The deposition apparatus may include a patterning slit sheet 180. The patterning slit sheet 180 may include a frame 185 having a window frame like shape and a sheet 183 coupled with the frame 185 by means such as welding. The sheet 183 may include a plurality of patterning slits 181 in a direction, for example, an X-axis. A deposition material 115 disposed in a deposition source 110 may be vaporized by means such as a heater, may be discharged onto a substrate 10 through a deposition source nozzle 171 of a deposition source nozzle unit 170 and through the patterning slits 181 of the patterning slit sheet 180. The deposition apparatus may further include a connecting element 187 that may couple at least one of the deposition source 110, the deposition source nozzle unit 170, and the patterning slit sheet 180.

In case of manufacturing an organic light-emitting display apparatus, an intermediate layer including an emission layer may include a common layer disposed throughout a display region and a pattern layer disposed in a preset region of the display region. The pattern layer may be formed by moving the deposition source 110, the deposition source nozzle unit 170, and the patterning slit sheet 180 parallel to the substrate 10. The laser unit 120 may be disposed on a rear end of the deposition source 110 and the mask 130 may be disposed on the rear end of the deposition source 110, to check the present positions of the deposition source 110, the deposition source nozzle unit 170, and the patterning slit sheet 180, and relocate them to target positions. The present positions of the deposition source 110, the deposition source nozzle unit 170, and the patterning slit sheet 180 may be determined from information of a laser image formed on the mask 130.

Figure 8:
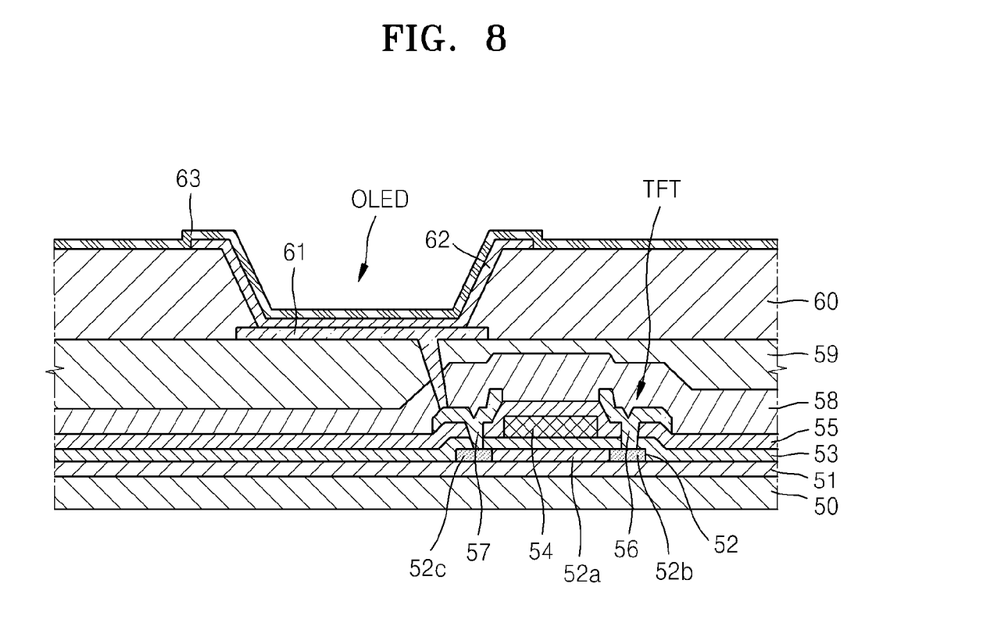
FIG. 8 is a schematic cross-sectional view illustrating an exemplary embodiment of an organic light-emitting display apparatus that can be manufactured by exemplary embodiments of the present invention.

FIG. 8 is a schematic cross-sectional view illustrating an exemplary embodiment of an organic light-emitting display apparatus that can be manufactured by exemplary embodiments of the present invention. Referring to FIG. 8, various elements of the organic light-emitting display apparatus are formed on a substrate 50. The substrate 50 may be formed of one of a glass material, a plastic material, and a metallic material.

On the substrate 50, common layers including a buffer layer 51, a gate insulating layer 53, and an intermediate dielectric 55 may be formed on the entire surface of the substrate 50. A patterned semiconductor layer 52, including a channel area 52$a$, a source contact area 52$b$, and a drain contact area 52$c$, may be formed. Elements of a thin film transistor (TFT) including a gate electrode 54, a source electrode 56, and a drain electrode 57 may also be formed.

A passivation layer 58 covering the TFT and a planarization layer 59 disposed on the passivation layer 58 may be formed on the entire surface of the substrate 50. On the planarization layer 59, a patterned pixel electrode 61, a counter electrode 63 corresponding to the entire surface of the substrate 50 may be formed. An organic light-emitting device (OLED) including an intermediate layer 62 having a multilayer structure including an emission layer may be disposed between the pixel electrode 61 and the counter electrode 63. In another exemplary embodiment, at least one layer of the intermediate layer may be formed as a common layer corresponding to the entire surface of the substrate 50, and other layers of the intermediate layer may be formed as a pattern layer patterned corresponding to the pixel electrode 61. The pixel electrode 61 may be electrically connected to the TFT through a via hole. A pixel-defining layer 60 may be disposed on the planarization layer 59 corresponding to the entire surface of the substrate 50 to cover edges of the pixel electrode 61 and have an opening defining each pixel area.

The deposition apparatus according to the exemplary embodiments of this invention may be used to manufacture the organic light-emitting display apparatus described above. For example, a hole injection layer (HIL), a hole transport layer (HTL), an emission layer (EML), an electron transport layer (ETL), and an electron injection layer (EIL), which may be included in the intermediate layer 62, may be formed using the deposition apparatus or the method of manufacturing the organic light-emitting display apparatus described in the exemplary embodiment of present invention.

When forming the respective layers of the intermediate layer 62 after disposing the pixel electrode 61, a deposition assembly including a deposition source, a deposition source nozzle unit, and a patterning slit sheet, disposed apart from the substrate, and may relocate itself to target positions relative with respect to the substrate and deposit layers. The position controller 100 enables the deposition apparatus to precisely control the position of the deposition source and deposit the intermediate layer in the target region, even on a large substrate. Accordingly, it is possible to manufacture high quality organic light-emitting display apparatuses.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A position controller, comprising:
   a moving part configured to process a workpiece;
   a laser unit disposed on one side of the moving part configured to radiate laser;
   a mask on which a laser image is formed corresponding to the irradiated laser; and
   a position control unit configured to position the moving part based on information of the laser image,
   wherein the position control unit comprises:
      a first control part configured to move the moving part by a first distance unit; and
      a second control part configured to move the moving part by a second distance unit and rotate the moving part, wherein the second distance unit is smaller than the first distance unit.

2. The position controller of claim 1, further comprising a photographic unit configured to capture the laser image.

3. The position controller of claim 2, further comprising a control unit configured to determine at least one of coordinates and a shape of the laser image from the laser image captured by the photographic unit, and determine a present position of the moving part from the coordinates and shape of the laser image.

4. The position controller of claim 2, wherein the control unit is configured to further determine whether the moving part is disposed in parallel with the mask by comparing the laser image to a reference image.

5. The position controller of claim 2, wherein the laser unit, the mask, and the photographic unit are disposed collinearly.

6. The position controller of claim 2, wherein the mask is disposed between the laser unit and the photographic unit.

7. The position controller of claim 1, wherein the mask comprises a transparent material having at least one pattern on the transparent material.

8. The position controller of claim 7, wherein the pattern comprises a first pattern comprising marks two-dimensionally arranged at interval of a first distance unit.

9. The position controller of claim 8, wherein the pattern further comprises a second pattern comprising marks two-dimensionally arranged at interval of a second distance unit, wherein the second distance unit is smaller than the first distance unit.

10. The position controller of claim 1, wherein the laser unit comprises a first laser unit and a second laser unit disposed in parallel with each other on one side of the moving part.

11. The position controller of claim 10, wherein the control unit is configured to determine the information of the laser image comprising vector information between two laser images corresponding to the first and second laser units.

12. The position controller of claim 1, wherein the laser unit comprises three laser units disposed in an equilateral triangle on one side of the moving part.

13. The position controller of claim 12, wherein the control unit is configured to determine the information of the laser image comprising information on a polygon formed by connecting the three laser images.

14. The position controller of claim 1, wherein the moving part comprises at least one of an inkjet head unit, a die cutting unit, and a laser scanning head unit.

15. The position controller of claim 1, wherein the workpiece, the moving part, the laser unit, and the mask are sequentially disposed.

16. A processing apparatus, comprising:
   a position controller comprising:
      a moving part configured to process a workpiece;
      a laser unit disposed on one side of the moving part and configured to radiate a laser;
      a mask on which a laser image is formed corresponding to the irradiated laser; and
      a position control unit configured to position the moving part based on information of the laser image; and
   a stage configured to support the workpiece,
   wherein the position control unit comprises:
      a first control part configured to move the moving part by a first distance unit; and
      a second control part configured to move the moving part by a second distance unit and rotate the moving part, wherein the second distance unit is smaller than the first distance unit.

17. A measuring apparatus, comprising:
   a position controller, comprising:
   a moving part configured to measure a workpiece;
   a laser unit disposed on one side of the moving part and configured to radiate a laser;
   a mask on which a laser image is formed corresponding to the irradiated laser; and
   a position control unit configured to position the moving part based on information of the laser image; and
   a stage supporting the workpiece,
   wherein the position control unit comprises:
      a first control part configured to move the moving part by a first distance unit; and a second control part configured to move the moving part by a second distance unit and rotate the moving part, wherein the second distance unit is smaller than the first distance unit.

18. A method of controlling a position of a moving part, the method comprising:
   relocating the moving part by a first distance unit or more;
   radiating a laser from a laser unit disposed on one side of the moving part onto a mask disposed in a backward area of the moving part; and
   relocating the moving part by a second distance unit based on information of a laser image formed by the laser irradiated on the mask, wherein the second distance unit is smaller than the first distance unit.

19. The method of claim 18, wherein the relocating the moving part by a second distance unit step further comprises determining information of the laser image by a control unit from the laser image, wherein the information comprises at least one of a shape and coordinates of the laser image when the laser unit radiates one laser, vector information from laser images when the laser unit radiates two lasers, or an information on a polygon formed by connecting the laser images when the laser unit radiates three or more lasers.

* * * * *